United States Patent [19]
Nisenson

[11] 3,920,106
[45] Nov. 18, 1975

[54] REVERSIBLE SINGLE REVOLUTION CLUTCH

[76] Inventor: Jules Nisenson, Trafalger Towers, S. Ocean Drive, Hollywood, Fla. 33020

[22] Filed: Nov. 5, 1973

[21] Appl. No.: 413,056

[52] U.S. Cl. .............. 192/33 C; 192/26; 192/41 S; 192/43
[51] Int. Cl. ...................... F16d 13/04; F16d 11/06
[58] Field of Search ............ 192/26, 33 C, 41 S, 43

[56] References Cited
UNITED STATES PATENTS

| | | | |
|---|---|---|---|
| 2,951,568 | 9/1960 | Hungerford, Jr. et al. ...... | 192/415 X |
| 3,033,336 | 5/1962 | Kinsman ............................ | 192/415 |
| 3,087,587 | 4/1963 | Flieg ................................ | 192/415 X |
| 3,225,875 | 12/1965 | Thomas et al. ..................... | 192/26 |
| 3,337,015 | 8/1967 | Wagner ......................... | 192/33 C X |
| 3,493,088 | 2/1970 | Hoff ................................. | 192/26 |
| 3,648,810 | 3/1972 | Weatherby .................... | 192/33 C X |
| 3,726,372 | 4/1973 | Baer et al. ..................... | 192/33 C X |
| 3,844,390 | 10/1974 | Lowery ............................. | 192/26 |

FOREIGN PATENTS OR APPLICATIONS

| | | | |
|---|---|---|---|
| 866,034 | 6/1941 | France ............................... | 192/43 |

OTHER PUBLICATIONS
"Basic Design of Spring Clutches," V. W. Rudnickas and R. A. Fine, Machine Design, May 13, 1965, pp. 182–186.

*Primary Examiner*—Samuel Scott
*Assistant Examiner*—Lance W. Chandler
*Attorney, Agent, or Firm*—Charles E. Temko

[57] ABSTRACT

A single revolution clutch of a type employed for transmitting motion through uniform angular increments of 360° in either of two predetermined directions. The device includes a motion input hub element, a motion output hub element, a contractile spring, one end of which communicates with the input hub element, and the convolutions of which selectively contract on the output hub element. An annular sleeve element surrounds the spring and includes internal means communicating with the other end of the spring, the outer surface of the sleeve element including means for engaging a pivotally mounted lug at a predetermined point causing relative rotation between the sleeve element and the output hub element resulting in the opening of the convolutions of the spring and the interrupting of transmission of motion through the clutch. The sleeve is reversible end for end to permit use of the device for the transmission of motion in either of two opposite rotational directions.

1 Claim, 4 Drawing Figures

3,920,106

REVERSIBLE SINGLE REVOLUTION CLUTCH

BACKGROUND OF THE INVENTION

This invention relates generally to the field of clutches and more particularly to so-called single revolution clutches which are employed to transmit rotational motion through a predetermined angular displacement. Devices of this general type are well known in the art, and the invention lies in specific constructional details permitting economies in production and distribution, as well as lower cost of manufacture.

Devices of this general type have been previously manufactured in a variety of sizes, depending upon the amount of torque to be transmitted, and the particular type of installation involved. In addition to the necessity of stocking a variety of sizes of such clutches, it has been customary to manufacture so-called left-hand and right-hand clutches, each of which is capable of transmitting motion only in a single rotational direction. While normally the number of sizes of clutches cannot be easily reduced, the inconvenience of stocking both left-hand and right-hand clutches in any given size has made for unnecessarily large inventories.

BRIEF DESCRIPTION OF THE PRESENT INVENTION

Briefly stated, the invention contemplates the provision of a single clutch, in which the component parts are adjustable, prior to installation, to permit the device to be used for the transmission of motion in either of two opposite rotational directions, the adjustment normally requiring only the end for end reversal of one of the component parts. By maintaining the device in assembled condition by the use of a single relilient snap ring, it can be readily disassembled, adjusted and reassembled, prior to installation without difficulty. This capability, permits an approximate 50% reduction in the number of clutches which need be inventoried at any one point, with substantial consequent savings.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
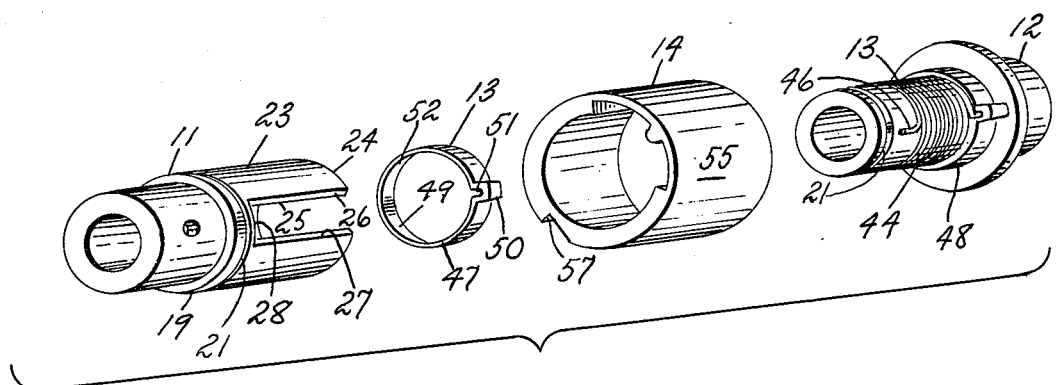
FIG. 1 is an exploded view in perspective of an embodiment of the invention.
Figure 2:
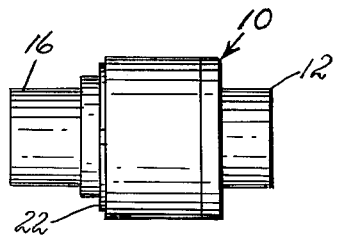
FIG. 2 is a side elevational view of the embodiment in fully assembled condition.

In accordance with the invention, the device, generally indicated by reference character 10 comprises broadly: a motion input hub element 11, an motion output hub element 12, an interconnecting clutch element 13, and an actuating sleeve element 14.

The input hub element 11 includes a hub 16 having a transverse bore 17 for a locking pin (not shown) and an axially disposed bore 18 for the engagement of a motion transmitting shaft (not shown). Surrounding the hub 16 is a radially extending flange 19 having a recess 20 and a groove 21 for the accommodation of a conventional snap ring 22. A hollow sleeve 23 extends rightwardly as seen in FIG. 1 from the flange 19. Extending leftwardly from an outer end 24 thereof is a rectangularly shaped cut out portion 25 defining side edges 26 and 27, and an inner end edge 28.

The motion output hub element 12 includes a cylindrical hub 30 having an axially disposed bore 31 and a transverse bore 32 for the interconnection of an output shaft (not shown). An annular shoulder 33 positions a radially extending flange 34 having a cylindrical inner surface 35, an outer surface 36, an inner surface 37, and a peripheral surface 38 of diameter substantially corresponding to that of the snap ring 22. Extending leftwardly as seen in FIGS. 1 and 3 is a sleeve 39 of reduced diameter, having an outer surface 40 into which an annular groove 41 extends, said groove being engaged by the snap ring 22 when the device is in assembled condition.

The interconnecting clutch element 13 includes a coil spring 44 having first and second longitudinally arranged terminals 45 and 46, respectively. Each of the terminals 45–46 is provided with an actuating ring 47–48 including a continuous band 49 and a radially-extending projection 50 the base of which forms a groove 51 for the engagement of the terminals 45–46. The inner surface 52 of each of the rings slidably contacts the outer surface 40 of the sleeve 39, as best seen in FIG. 3.

Figure 4:
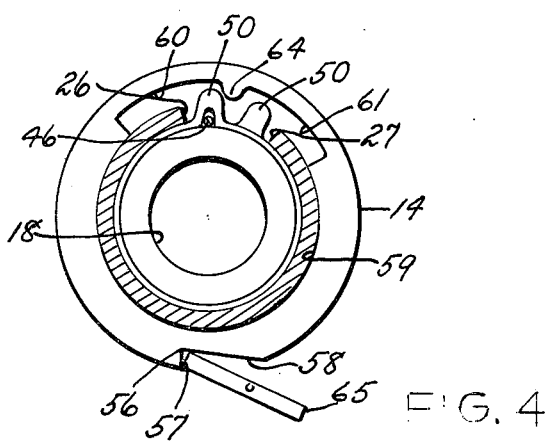
FIG. 4 is a transverse sectional view as seen from the plane 4—4 in FIG. 3.

The actuating sleeve element 14 of cylindrical configuration, and includes an outer surface 55 having a directionally oriented notch 56 formed by a radially positioned surface 57 and a surface 58 at substantially right angles thereto. As seen in FIG. 4, the notch 56 is selectively engaged by a pivotally mounted lug 65, the details of which form no part of the present disclosure, but which are well known in the art. The inner surface thereof is formed by an axially disposed bore 59 having first and second longitudinally extending grooves 60 and 61. A medially positioned transversely extending rib 64 is positioned between the projections of the rings 47 and 48, as best seen in FIG. 4.

Figure 3:
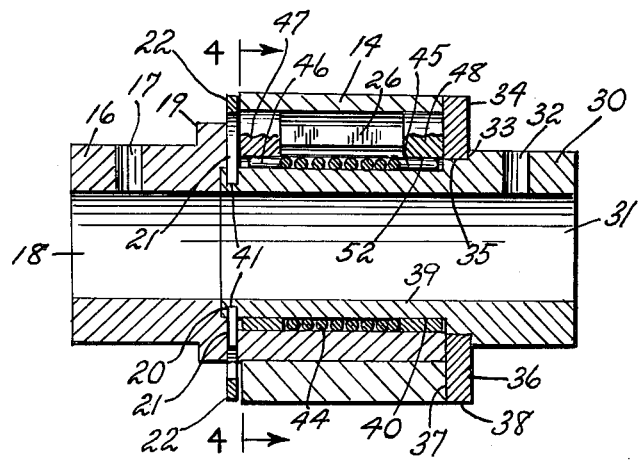
FIG. 3 is an enlarged central longitudinal sectional view thereof.

From a consideration of FIGS. 3 and 4 of the drawing, it will be apparent that when the lug is disengaged from the notch 56, the sleeve element 14 will turn with the motion input hub element 11. Upon the arresting of the sleeve element 14 by engagement of the notch 56 by the lug, continued movement of the input hub element 11 will cause the rib 64 to engage a projection 50 on one of the rings 47–48, and by preventing further movement of the corresponding terminal 45–46, open the convolutions of the spring 44, and prevent further transmission of motion through the clutch element 13.

When it is desired to employ the clutch for transmission of motion in an opposite direction, it is necessary only to open the snap ring 22, remove the same, and reverse end for end the sleeve element 14 upon the clutch element. This will direct the notch 56 in an opposite direction, and, after reassembly, the device will function in otherwise identical manner.

I wish it to be understood that I do not consider the invention limited to the precise details of structure shown and set forth in this specification, for obvious modifications will occur to those skilled in the art to which the invention pertains.

I claim:

1. A single revolution clutch of type employed for transmitting motion through uniform angular increments comprising: a motion input hub element, a motion output hub element, an interconnecting clutch element, and an actuating sleeve element; said input hub element including a hollow cylindrical sleeve member having a cut out segment therein defining a pair of opposed parallel edges; said output element including a second sleeve positioned within said first sleeve; said clutch element including a contractile coil spring surrounding said second sleeve and having first and second oppositely disposed terminals, first and second actuating rings each having a radially-extending projecting thereon engaged with said first and second terminals of said spring, said projections being positioned between said pair of opposed parallel edges, whereby rotational motion in either direction imparted to said input hub element will be transmitted through one of said projections to result in the tightening of the convolutions of said coil spring upon said second sleeve, and the transmission of motion to said output hub element; said actuating sleeve element surrounding said coil spring and having inner and outer generally cylindrical surfaces, said outer surface having a direction-oriented notch for selective engagement by a pivotally mounted lug to prevent rotation in a given direction, said inner surface having an axially arranged groove and a radially inwardly directed transversely extending rib selectively contacting either of said projections to result in opening of the convolutions of said spring to interrupt transmission of motion between said input and output hubs upon the prevention of rotation of said actuating sleeve element, and the continued rotation of saiid input hub element; said sleeve element being selectively repositionable, end for end, upon said spring to position said notch for operation in either of two opposite rotational directions.

\* \* \* \* \*